United States Patent
Blasco et al.

(10) Patent No.: US 10,223,123 B1
(45) Date of Patent: Mar. 5, 2019

(54) METHODS FOR PARTIALLY SAVING A BRANCH PREDICTOR STATE

(71) Applicant: Apple Inc., Cupertino, CA (US)

(72) Inventors: Conrado Blasco, Sunnyvale, CA (US); Brett S. Feero, Austin, TX (US); David Williamson, Austin, TX (US); Ian D. Kountanis, Santa Clara, CA (US); Shih-Chieh Wen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 15/133,804

(22) Filed: Apr. 20, 2016

(51) Int. Cl.
*G06F 1/32* (2006.01)
*G06F 9/30* (2018.01)
*G06F 9/38* (2018.01)
*G06F 12/0875* (2016.01)
*G06F 1/3287* (2019.01)
*G06F 1/3234* (2019.01)

(52) U.S. Cl.
CPC .......... *G06F 9/3806* (2013.01); *G06F 1/3275* (2013.01); *G06F 1/3287* (2013.01); *G06F 9/30058* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 5,740,417 A * | 4/1998 | Kennedy | ............... | G06F 1/3203 712/239 |
| 7,925,853 B2 | 4/2011 | Gschwind et al. | | |
| 8,656,198 B2 | 2/2014 | Branover et al. | | |
| 9,098,284 B2 | 8/2015 | Licht et al. | | |
| 2004/0210728 A1 * | 10/2004 | Flautner | ............... | G06F 12/0893 711/156 |
| 2006/0092712 A1 * | 5/2006 | Park | ....................... | G06F 9/3806 365/189.011 |
| 2008/0082843 A1 * | 4/2008 | Schuler | .................. | G06F 9/3806 713/323 |
| 2008/0148028 A1 * | 6/2008 | Grandou | ............... | G06F 9/3806 712/238 |
| 2013/0290676 A1 * | 10/2013 | Aggarwal | ............. | G06F 1/3243 712/205 |

(Continued)

OTHER PUBLICATIONS

Sadeghi et al., Power-aware Branch Target Prediction Using a New BTB Architecture, Oct. 2009, pp. 1-6 (Year: 2009).*

*Primary Examiner* — George Giroux

(74) *Attorney, Agent, or Firm* — Meyertons, Hood, Kivlin, Kowert & Goetzel, P.C.

(57) ABSTRACT

In an embodiment, an apparatus includes a plurality of memories configured to store respective data in a plurality of branch prediction entries. Each branch prediction entry corresponds to at least one of a plurality of branch instructions. The apparatus also includes a control circuit configured to store first data associated with a first branch instruction into a corresponding branch prediction entry in at least one memory of the plurality of memories. The control circuit is further configured to select a first memory of the plurality of memories, to disconnect the first memory from a power supply in response to a detection of a first power mode signal, and to cease storing data in the plurality of memories in response to the detection of the first power mode signal.

20 Claims, 7 Drawing Sheets

(56) References Cited

U.S. PATENT DOCUMENTS

| | | | |
|---|---|---|---|
| 2014/0025967 A1* | 1/2014 | Tran | G06F 1/3206 |
| | | | 713/320 |
| 2014/0229720 A1* | 8/2014 | Hickey | G06F 1/324 |
| | | | 712/240 |
| 2014/0359330 A1 | 12/2014 | Tokman | |
| 2015/0121050 A1* | 4/2015 | Williams | G06F 9/30058 |
| | | | 712/238 |
| 2015/0293571 A1* | 10/2015 | Wan | G06F 1/266 |
| | | | 713/300 |
| 2015/0331691 A1* | 11/2015 | Levitan | G06F 9/30058 |
| | | | 712/240 |

* cited by examiner

METHODS FOR PARTIALLY SAVING A BRANCH PREDICTOR STATE

BACKGROUND

Technical Field

Embodiments described herein are related to the field of integrated circuit implementation, and more particularly to the operation of processing cores.

Description of the Related Art

Some processors and systems-on-a-chip (SoCs) support reduced power modes in which voltage levels of predetermined power supplies may be reduced, and some circuits may be disconnected from power supplies. These reduced power modes may be used during times when the processor or SoC is inactive. In some reduced power modes, some circuits may be disabled if they are not needed during the inactive time. When a processor enters a reduced power mode, data held in various memories used by the processor may be lost if the respective memory is disabled during the reduced power mode. Upon returning to an operating mode from a reduced power mode, disabled memories may not provide significant benefit to the processor until a suitable amount of data has been stored therein. For example, a branch prediction table may not be very useful until entries for at least one branch instruction have been filled.

SUMMARY OF THE EMBODIMENTS

Various embodiments of a processor are disclosed. Broadly speaking, a system, an apparatus, and a method are contemplated in which the apparatus includes a plurality of memories that may be configured to store respective data in a plurality of branch prediction entries. Each branch prediction entry may corresponds to at least one of a plurality of branch instructions. The apparatus also includes a control circuit that may be configured to store first data associated with a first branch instruction into a corresponding branch prediction entry in at least one memory of the plurality of memories. The control circuit may be further configured to select a first memory of the plurality of memories dependent upon branch prediction data stored in the plurality of memories. The control circuit may also be configured to power-down the first memory in response to a detection of a first power mode signal, to maintain power to one or more memories of the plurality of memories excluding the first memory, and to cease storing data in the one or more memories in response to the detection of the first power mode signal.

In a further embodiment, the apparatus may also include an execution unit configured to enter a power-down mode in response to the detection of the first power mode signal. In another embodiment, to select the first memory of the plurality of memories, the control circuit may be further configured to select a given memory of the plurality of memories with a greatest number of branch prediction entries that are storing respective data.

In an embodiment, each branch prediction entry of the plurality of branch prediction entries may include a respective status value indicative of a usefulness of data stored in the corresponding branch prediction entry. To select the first memory of the plurality of memories, the control circuit may be further configured to select a given memory of the plurality of memories dependent upon the status value in each of the plurality of branch prediction entries.

In another embodiment, the control circuit may be further configured to modify a count value dependent upon a clock signal in response to the detection of the first power mode signal. In a further embodiment, the control circuit may also be configured to disconnect power to each of the one or more memories of the plurality of memories in response to a determination that the count value is equal to a predetermined threshold value.

In one embodiment, the control circuit may be further configured to prefetch one or more instructions in response to a detection of a second power mode signal, and to determine that the one or more instructions includes a second branch instruction. The control circuit may also be configured to utilize a second branch prediction entry from a given memory of the one or more memories of the plurality of memories in response to a determination that the second branch prediction entry corresponds to the second branch instruction. The second branch prediction entry may be stored in the given memory prior to the detection of the first power mode signal.

BRIEF DESCRIPTION OF THE DRAWINGS

The following detailed description makes reference to the accompanying drawings, which are now briefly described.

Figure 1:
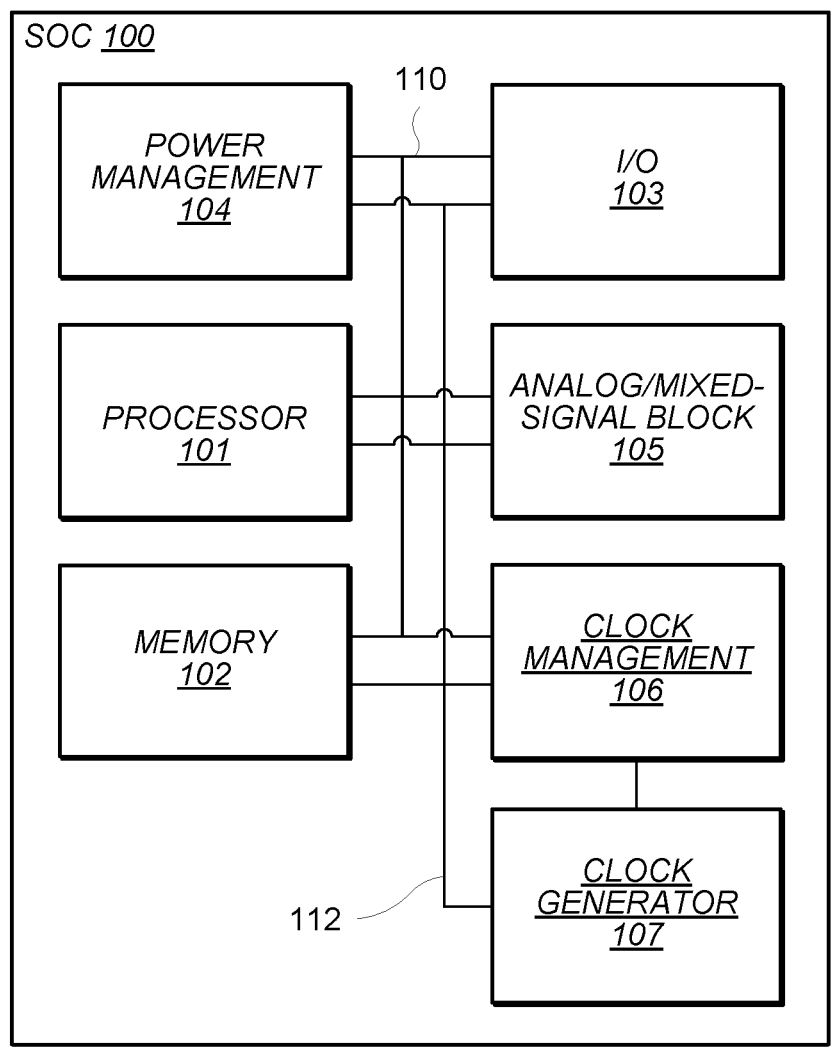
FIG. 1 shows a block diagram of an embodiment of a system-on-a-chip (SoC).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Processing core resources, such as, for example, branch prediction tables may improve performance and/or efficiency of a processing core by storing data indicating whether or not a given branch instruction will take a branch or not. These resources, however, may not provide significant benefit until they have stored an appropriate amount of data. When a processing core enters a reduced power mode, power to memories storing branch prediction tables may be reduced or removed, thereby causing the stored data to be lost. When these memories return to an operational state, they need to be refilled with valid data. The processing core may execute hundreds, thousands, or more, of instructions before the branch prediction tables include enough data to provide a significant benefit to the processing core.

Embodiments of systems and methods for retaining data in branch prediction tables are disclosed herein. The disclosed embodiments demonstrate methods for storing and preserving data in branch prediction tables.

A block diagram of an embodiment of an SoC is illustrated in FIG. 1. In the illustrated embodiment, SoC 100 includes processor 101 coupled to memory block 102, I/O block 103, power management unit 104, analog/mixed-signal block 105, clock management unit 106, all coupled through bus 110. Additionally, clock generator 107 may be coupled to clock management unit 106 and provide a clock signal 112 to the functional blocks in SoC 100. In various embodiments, SoC 100 may be configured for use in a mobile computing application such as, e.g., a tablet computer, smartphone or wearable device.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores and may include one or more register files and memories.

In various embodiments, processor 101 may implement any suitable instruction set architecture (ISA), such as, e.g., PowerPC™, ARM®, or x86 ISAs, or combination thereof. Processor 101 may include one or more bus transceiver units that allow processor 101 to communication to other functional blocks via bus 110, such as, memory block 102, for example.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM). Some embodiments may include a single memory, such as memory block 102 and other embodiments may include more than two memory blocks (not shown). In some embodiments, memory block 102 may be configured to store program instructions that may be executed by processor 101. Memory block 102 may, in other embodiments, be configured to store data to be processed, such as graphics data, for example. Memory block 102, may, in some embodiments, include a memory controller for interfacing to memory external to SoC 100, such as, for example, one or more DRAM chips.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. I/O block 103 may include general-purpose input/output pins (I/O pins). In some embodiments, I/O block 103 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from a source external to SoC 100 and coupled through power supply pins. Power management unit 104 may include one or more voltage regulators to adjust outputs of the power supplies to various voltage levels as required by functional blocks in SoC 100, such as for reduced power modes, for example. For example, power management unit 104 may reduce a voltage level to one or more power supplies in response to a detecting a power mode signal.

Analog/mixed-signal block 105 may include a variety of circuits including, for example, a crystal oscillator, an internal oscillator, a phase-locked loop (PLL), delay-locked loop (DLL), or frequency-locked loop (FLL). One or more analog-to-digital converters (ADCs) or digital-to-analog converters (DACs) may also be included in analog/mixed signal block 105. In some embodiments, analog/mixed-signal block 105 may also include radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to enable, configure and monitor outputs of one or more clock sources. In various embodiments, the clock sources may be located in clock generator 107, analog/mixed-signal block 105, within clock management unit 106, in other blocks within SoC 100, or come from external to SoC 100, coupled via one or more I/O pins. In some embodiments, clock management 106 may be capable of configuring a selected clock source before it is distributed throughout SoC 100. Clock management unit 106 may include registers for selecting an output frequency or reference clock of a PLL, FLL, DLL, or other type of closed-loop clock source.

Clock generator 107 may be a sub-module of analog/mixed signal block 105 or clock management unit 106. In other embodiments, clock generator 107 may be a separate module within SoC 100. One or more clock sources may be included in clock generator 107. In some embodiments, clock generator 107 may include PLLs, FLLs, DLLs, internal oscillators, oscillator circuits for external crystals, etc. One or more clock signal outputs 112 may provide clock signals to various functional blocks of SoC 100.

System bus 110 may be configured as one or more buses to couple processor 101 to the other functional blocks within the SoC 100 such as, e.g., memory block 102, and I/O block 103. In some embodiments, system bus 110 may include interfaces coupled to one or more of the functional blocks that allow a particular functional block to communicate through the bus. In some embodiments, system bus 110 may allow movement of data and transactions (i.e., requests and responses) between functional blocks without intervention from processor 101. For example, data received through the I/O block 103 may be stored directly to memory block 102.

SoC 100 may be implemented in any suitable IC manufacturing process, such as, for example, a Complementary Metal-oxide Semiconductor (CMOS) processes. A Metal-Oxide-Semiconductor Field-Effect Transistor (MOSFET) describes a type of transistor that may be used in modern digital logic designs. MOSFETs are designed as one of two basic types, n-channel and p-channel. CMOS describes a circuit designed with a mix of n-channel and p-channel MOSFETs. In CMOS designs, n-channel and p-channel MOSFETs may be arranged such that a high level on the gate of a MOSFET turns an n-channel (NMOS) transistor on, i.e., opens a conductive path, and turns a p-channel (PMOS) transistor off, i.e., closes a conductive path. Conversely, a low level on the gate of a MOSFET turns a p-channel on and an n-channel off. While CMOS logic is used in the examples described herein, it is noted that any suitable logic process may be used for the circuits described in embodiments described herein.

It is noted that the SoC illustrated in FIG. 1 is merely an example. In other embodiments, different functional blocks and different configurations of functions blocks may be possible dependent upon the specific application for which the SoC is intended.

Figure 2:
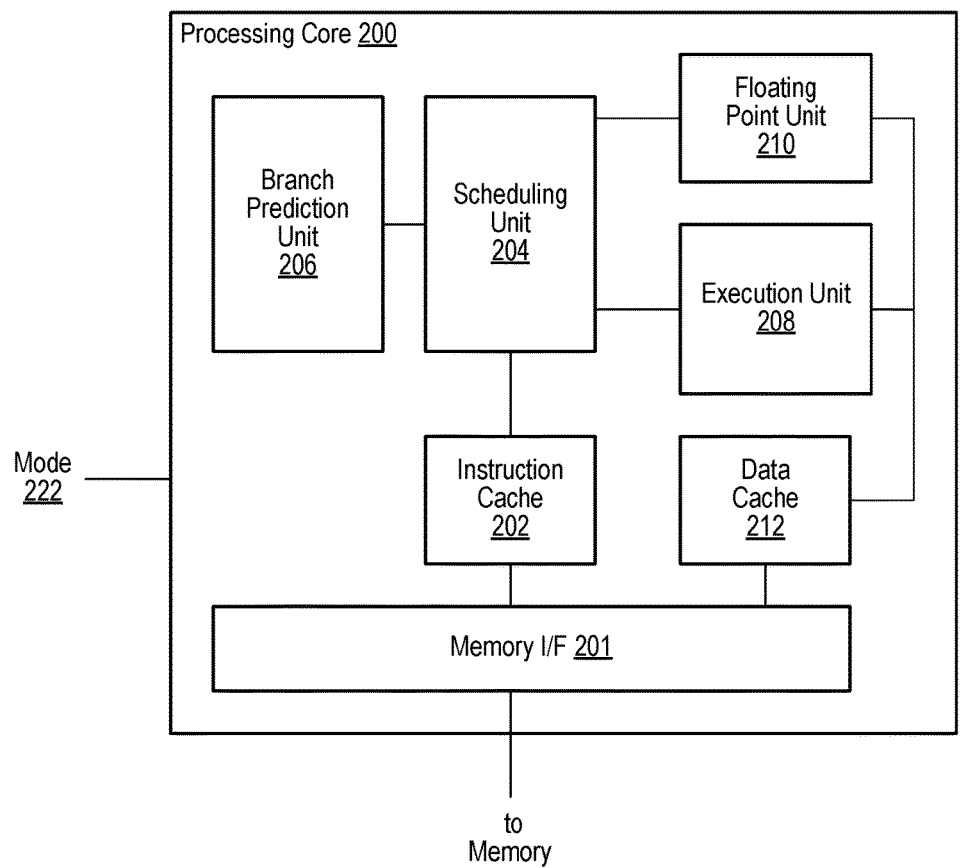
FIG. 2 illustrates a block diagram of an embodiment of a processing core.

Moving now to FIG. 2, a block diagram of an embodiment of processing core is illustrated. Processing Core 200 may be a part of a larger processor or SoC, such as, for example, SoC 100 in FIG. 1, and may correspond to be one of multiple processing cores in the processor or SoC. In the present embodiment, Processing Core 200 includes multiple sub modules, such as memory interface (memory I/F) 201 coupled to Instruction Cache 202 and Data Cache 212. Instruction Cache 202 is coupled to Scheduling Unit 204 which is, in turn, coupled to Branch Prediction Unit 206, Execution Unit 208, and Floating Point Unit 210. Processing Core 200 also receives signal Mode 222.

In the illustrated embodiment, Memory Interface 201 is used to fetch instructions and data from memories located outside of processing core 200. Memory Interface 201 may be coupled to a higher level cache, such as, for example, an L2 or L3 cache, to a system memory, e.g., a static random access memory (SRAM) or a dynamic random access memory (DRAM), and to a non-volatile storage such as flash memory or a hard disk drive (HDD). In various embodiments, Memory Interface 201 may be coupled directly to some or all of these memories via a bus, or coupled to one or more memory controller units that receive memory requests from Memory Interface 201 and reply to the requests with appropriate data from a corresponding memory location. Memory Interface 201 may include individual circuits for fetching instructions and fetching data, or may share circuitry for data and instruction fetches.

Instructions fetched via Memory Interface 201 may be stored in Instruction Cache 202. Instruction Cache 202 may be implemented as any suitable type of cache memory, such as, for example, direct mapped cache, two-way set associative, four-way set associative, and the like. In the present embodiment, Instruction Cache 202 includes multiple entries, referred to herein as cache lines. Each cache line may store one or more instructions from a software or firmware program to be executed by processing core 200. A given instructions may be prefetched, i.e., copied from memory into a corresponding cache line before the processing core is ready to execute the instruction. Such prefetching may reduce a number of wait states processing core 200 experiences by having a series of instructions preloaded into Instruction Cache 202 where they may be accessed faster than other memory locations in a computing system including processing core 200.

In the illustrated embodiment, Scheduling Unit 204 fetches instructions and places them in an instruction queue for execution by Execution Unit 208 or Floating Point Unit 210. Moreover, Scheduling Unit 204 retrieves instructions from Instruction Cache 202, and places the instruction into an instruction queue within Scheduling Unit 204. Scheduling Unit 204 may also control prefetching of instructions for Instruction Cache 202, including determining a rate at which Instruction Cache 202 prefetches instructions.

Scheduling Unit 204, in the present embodiment, uses Branch Prediction Unit 206 to help predict a flow of an active program. When an instruction other than a branch or jump instruction is executed, a program counter within Scheduling Unit 204 is incremented (or, in some embodiments, decremented). A value in the program counter is used to point to a memory address storing the next instruction for the active program. When a branch or jump instruction is executed, a new value may be written to the program counter, causing program flow to deviate to another portion of code, such as, for example, a subroutine or back to a beginning of a software loop. During execution of a branch instruction, a determination is made based on a data value or condition of processing core 200 to either continue the linear program flow (i.e., do not take a branch), or to fetch a next instruction from an non-contiguous memory location (i.e., take the branch). When prefetching instructions, a branch instruction impacts the next prefetch. For example, if a branch instruction is included in a first prefetch and a second prefetch assumes a linear program flow, then if the branch is taken (i.e., non-linear program flow), the second prefetch may be useless as the second prefetched instructions won't be the next instructions to be executed. Branch Prediction Unit 206 is used by Scheduling Unit 204 to help predict if a given branch instruction will be taken or not.

In some embodiments, a single data bit may be used as prediction indicator with a first value of the bit predicting the branch will not be taken and a second value predicting the branch will be taken. Other embodiments may use more than one bit as a prediction value. For example, if two bits are used, then four predictions may be assigned to a given branch instruction. For the embodiments, included herein, two bits are assigned to each branch prediction value, with the four states corresponding to strongly predicting a branch is taken, weakly predicting a branch is taken, weakly predicting a branch is not taken, and strongly predicting a branch is not taken. Scheduling Unit 204 may use a corresponding entry in Branch Prediction Unit 206 to determine a memory location for a next instruction prefetch.

Branch Prediction Unit 206 may include multiple tables, with each table including multiple entries for storing data related to branch instructions. In some embodiments, for example, the entries may store a history of branches taken and not taken for executed branch instructions. Each entry in a first table may correspond to a respective set of memory addresses. As a given branch instruction is fetched, the entry corresponding to the address of the given branch instruction may be allocated to the given branch instruction. Upon execution of the branch instruction, a value associated with the entry may be updated dependent upon the direction taken from the given branch instruction.

In some embodiments of Branch Prediction Unit 206, an entry allocated to a given branch instruction may include a predicted destination address in addition to a predicted direction. Some branch instructions may include a constant address offset for a branch taken destination, while other branch instructions may include a variable value for determining the destination of the branch, such as a value in a core register or memory location. For branch instructions that include a variable value, the destination address may be predicted as well as the direction of the instruction.

In the present embodiment, Execution Unit 208 retrieves instructions from an instruction queue that has been populated by Scheduling Unit 204. Execution Unit 208 processes logic and integer instructions, while floating point instructions are retrieved by Floating Point Unit 210. In some embodiments, Execution Unit 208 and Floating Point Unit 210 may retrieve instructions from the same instruction queue, in which instructions in the queue are tagged for processing by the appropriate unit. In other embodiments, Scheduling Unit 204 may include separate instruction queues for Execution Unit 208 and Floating Point Unit 210. To process instructions, Execution Unit 208 or Floating Point Unit 210 may fetch data from Data Cache 212.

Data Cache 212 may be implemented as any suitable type of cache memory, such as, for example, direct mapped cache, two-way set associative, four-way set associative, and the like. In the present embodiment, Data Cache 212 includes multiple entries, referred to herein as cache lines. Each cache line may store one or more data items to be used by Execution Unit 208 and/or Floating Point Unit 210. Data items may include any data values used during process of instructions.

In the illustrated embodiment, Processing Core 200 receives Mode signal 222. Mode signal 222 indicates a power mode for Processing Core 200. In various embodiments, the Mode signal 222 may correspond to a single signal to indicate one of two power modes or a group of signals to indicate one of multiple power modes. In response to a given value of Mode signal 222, one or more sub modules in Processing Core 200 may enter reduced power or power-down modes. For example, Mode signal 222 may include two signals to indicate one of four power modes, including a fully operational mode, a reduced functionality mode, an idle mode, and a power-down mode. In the fully operational mode, all sub modules may be powered, while in the power-down mode, many of the sub modules may be powered-down. In the power-down mode, some sub modules may continue to receive power to retain at least a portion of their state and/or memory.

It is noted that, to improve clarity and to aid in demonstrating the disclosed concepts, the diagram of processing core 200 illustrated in FIG. 2 has been simplified. In other embodiments, different and/or additional circuit blocks and different configurations of the circuit blocks are possible and contemplated.

Figure 3:
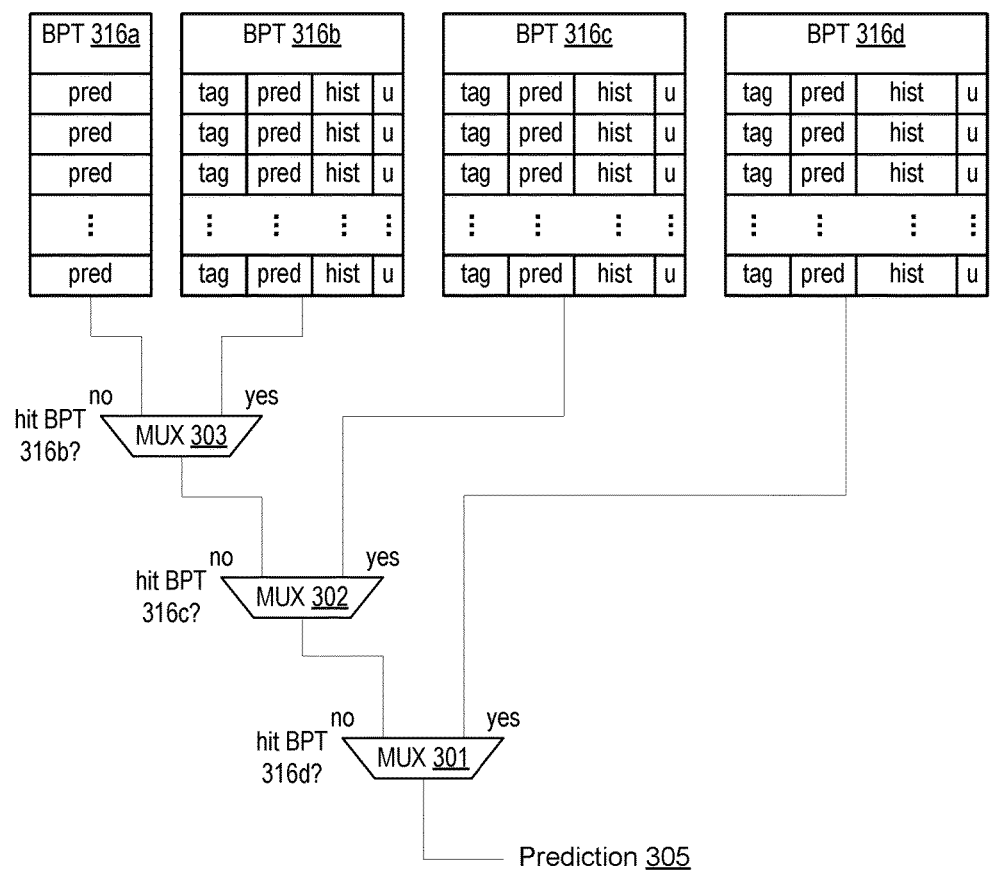
FIG. 3 shows a diagram of branch prediction tables for use by a branch prediction unit.

Turning to FIG. 3, a diagram of branch prediction tables for use by a branch prediction unit is shown. Branch Prediction Unit 300 may, in some embodiments, correspond to Branch Prediction Unit 106 in FIG. 1. The illustrated embodiment of Branch Prediction Unit 300 includes multiple branch prediction tables, BPT 316a through BPT 316d. Several multiplexing circuits, MUX 301 through MUX 303, are coupled to BPT 316a-d, and used to select and output a prediction value from one of BPTs 216a-d as prediction signal 305.

In the illustrated embodiment, Branch Prediction Unit 300 includes four branch prediction tables (BPTs) 316a-d used for predicting a direction that one or more branch instructions will take upon execution by, for example, Execution Unit 208 in FIG. 1. Each of the four BPTs 316a-d stores multiple entries, with entries storing data for corresponding branch instructions. When a given entry is allocated to a respective branch instruction, a default prediction value may be assigned to the allocated entry. In the present embodiment, default prediction values are stored in BPT 316a. Two data bits are used to indicate the prediction value, resulting in four possible predictions: strong taken, weak taken, weak not taken, and strong not taken. In various embodiments, any one of the four values may be assigned as a default prediction value. After execution of the given branch instruction, the prediction value may be updated. For example if the default prediction is weak taken and the branch is taken, then the prediction may be updated to strong taken. If, instead, the branch is not taken, then the prediction may be updated to weak not taken.

BPT 316b includes an address tag, a prediction value, and history data for each entry. When a given branch instruction is fetched, circuitry in Branch Prediction Unit 300 generates an address tag that corresponds to the memory address from where the given branch instruction was fetched. If an entry in BPT 316a corresponding to the address tag is available, then the entry is allocated to the given branch instruction. If the entry in BPT 316a corresponding to the address tag has already been allocated to the given branch instruction, then the most recent branch direction is added to the history data and the prediction value may be updated. If the corresponding entry has been allocated to store data relating to a different branch instruction, then another bit in the tag may be used to determine if the current allocated entry is useful. A respective additional useful bit may be included in the entry (shown as "u" in BPTs 316a-d). The useful bit indicates if the respective entry is useful for predicting the branch direction of the allocated instruction. If the respective useful bit indicates that the currently allocated entry is useful, then the allocation for the given branch instruction may be aborted and the attempted allocation may be referred to as unsuccessful. Otherwise, the entry may be updated to correspond to the given branch instruction.

In the present embodiment, BPT 316c includes similar data as BPT 316b for each entry, such as an address tag, a prediction value, history data, and a useful bit. BPT 316b includes a greater amount of history data than BPT 316b. The history data is used to track one or more recent branch directions taken by the corresponding branch instruction. For example, if three data bits are used for prediction history for a given entry, then the last three branch directions for the corresponding branch instruction may be tracked, with each bit indicating one branch direction. If the three previous branch directions are taken, taken, and not taken, then the respective data bit values may be 1, 1, and 0. This additional history data may be used to improve an accuracy of the prediction value. For example, a pattern may be recognized in which, for a given branch instruction, the not taken branch is not observed to occur two times in a row. In such a case, if the most recent branch direction was not taken, then prediction value may be updated to weak taken or strong taken. In some embodiments, a given entry in BPT 316b or BPT 416c may be updated on each fetch of an allocated branch instruction. In other embodiments, the given entry may be updated less frequently.

BPT 316d, in the illustrated embodiment, is similar in content and operation as BPT 316b and BPT 316c. BPT 316d includes more history data than BPT 316c and BPT 416b. For each entry in BPTs 316b-d, the respective prediction value may be updated dependent upon pattern recognition within the history data. For branch instructions used as part of software loops or other types of repetitive software processes, the increased history data may result in more accurate branch predictions. In other types of branch instructions, however, the predictions may be more random and the extra history data may result in lower accuracy of predictions. This progression from no history data in BPT 316a to the most history data in BPT 316d may result in improved efficiency for a greater number of branch instructions, and, therefore, for greater efficiency for a processing core that includes Branch Prediction Unit 300.

When a given branch instruction is fetched that has one or more allocated entries in BPTs 316a-d, circuitry in Branch Prediction Unit 300 looks for a corresponding entry in BPT 316d first by generating a tag value dependent upon the address of the given branch instruction. If the tag value matches an address tag in BPT 316d (a branch table "hit"), then a prediction value is retrieved from the hit entry and output as prediction value 305. Otherwise, BPT 316c is searched for a matching address tag, and then BPT 316b is searched, and then BPT 316a. MUXs 301-203 are set accordingly to select a prediction value 305 retrieved from a hit BPT 316a-d with the most history data. This type of branch prediction unit may be referred to as a tagged geometric prediction (TAGE) unit.

It is noted that in various embodiments, BPTs 316a-d may be stored in a single memory array, in one memory array per BPT, or any combination thereof. In addition, each entry may correspond to one or more memory cells or to one or more bytes of memory cells. In the following embodiments, one memory array per BPT is assumed.

It is also noted that the embodiment of Branch Prediction Unit 300 as illustrated in FIG. 3 is merely an example. The illustration of FIG. 3 has been simplified to highlight features relevant to this disclosure. Various embodiments may include different configurations of components, such as a different number of branch prediction tables, and/or differences in data stored in each entry of the branch prediction tables. Although a TAGE type of branch prediction unit is presented herein, other types of branch prediction units are contemplated.

Figure 4:
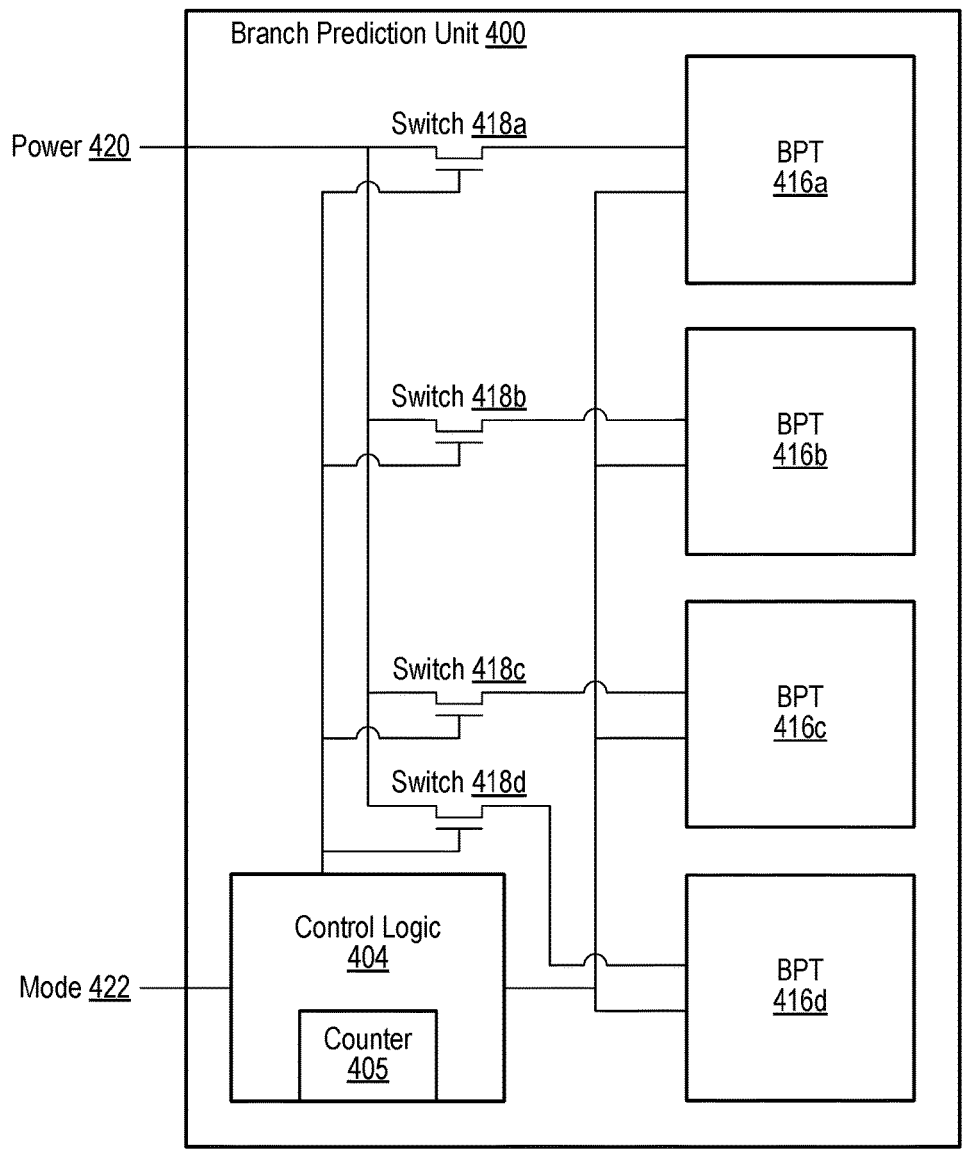
FIG. 4 illustrates a block diagram of an embodiment of a branch prediction unit.

Moving to FIG. 4, a block diagram depicting an embodiment of a branch prediction unit is illustrated. Branch Prediction Unit 400 may correspond to Branch Prediction Unit 206 in FIG. 2, which may be included in SoC 100 in FIG. 1. Branch Prediction Unit 400 includes Control Logic 404 coupled to branch prediction tables (BPTs) 416a-416d and to Switches 418a-418d. Control Logic 404 includes Counter 405. Branch Prediction Unit 400 receives signals Power 420 and Mode 422. Mode 422 may correspond to Mode signal 222 in FIG. 2.

In the illustrated embodiment, during normal operation, Mode 422 has a first value to indicate the normal operating mode. Control Logic 404 allocates entries into one or more of BPTs 416a-d for each executed branch instruction. Furthermore, Control Logic 404 powers-up BPTs 416a-d by closing each of Switches 418a-d to couple Power 420 to each of BPTs 416a-d. Although Switches 418a-d are illustrated as NMOS transistors, they may be implemented as any suitable switching circuit. Control Logic 404 allocates entries into BPTs 416a-d as described above in regards to FIG. 3. It is noted that although BPTs 416a-d are illustrated as four separate blocks, in various embodiments, all BPTs 416a-d may be included in a single memory with four separate power domains, four separate memories each in a respective power domain, or any suitable combination thereof.

At a given point in time, Mode 422 is set to a new value indicating a transition by SoC 100 into a reduced power mode. Mode 422 may be set to the new value in response to instructions executed by processor 101 or by various other logic circuits in SoC 100, such as, for example, control logic in Power Management Unit 104, or a sensing circuit in Analog/Mixed Signal Block 105. In response to detecting the new value of Mode 422, Control Logic 404 selects one or more of BPTs 416a-d to power down as part of the transition to the reduced power mode. In the present embodiment, at least one of BPTs 416a-d remains active to provide processing core 200 some branch predictions upon a return to the normal operating mode from the reduced power mode. Control Logic 404 powers-down the selected BPTs 416a-d by disconnecting the corresponding Switches 418a-d to disable power to the selected BPTs 416a-d. In some embodiments, the number of BPTs 416a-d that are selected may be determined dependent upon a type of reduced power mode indicated by Mode 422. For example, Mode 422 may include two data bits to indicate one of four modes: a normal operating mode and three reduced power modes. One, two, or three of BPTs 416a-d may be selected dependent upon which of the three reduced power modes is indicated. Of the three reduced power modes, at least one of the power modes may correspond to a power down mode in which power is removed from, or reduced to near zero volts for many of the circuits in SoC 100. In such a power down mode, a few selected circuits may retain power to preserve data in select memories, such as the unselected BPTs 416a-d, or to allow at least a minimal level of operation to some logic circuits, such as Control Logic 404, for example.

To select the one or more of BPTs 416a-d to power down, Control Logic 404 may any suitable criteria. For example, Control Logic 404 may select BPT 416a and BPT 416c by default. In other embodiments, Control Logic 404 may track parameters related to BPTs 416a-d, such as a number of allocated entries, or a number of entries with the useful bit (as described above in regards to FIG. 3) set. In some embodiments, each of BPTs 416a-d may have a corresponding threshold value. Control Logic 404 may select each BPT 416a-d in which track parameters are lower than the corresponding threshold value. In such embodiments, the threshold values may be weighted such that BPT 416d has a lower threshold value while BPT 416a has a higher threshold value. Since BPT 416d may store more history per entry, it may require more time to refill the stored data if lost in a power down, while BPT 416a, with less stored history per entry, may be refilled in less time.

In the illustrated embodiment, after powering down the selected BPTs 416a-d, Control Logic 404 enables Counter 405. Counter 405 increments (or decrements in some embodiments) a count value in response to an active clock signal. In various embodiments, Counter 405 increments (or decrements) in response to a rising transition, a falling transition, or either transition of the active clock signal. A source of the clock signal may be a core clock, a bus clock, a real-time clock, or any other suitable clock source. If the count value reaches a predetermined threshold before Mode 422 indicates a return to normal operating mode, then Control Logic 404 disables any of Switches 418a-d that are still enabled, thereby powering down all of BPTs 416a-d to further reduce power. In contrast, if Mode 422 indicates a return to the normal operating mode before the count value reaches the threshold value, then Control Logic 404 enables Switches 418a-d that correspond to the selected BPTs 416a-d. If Processing Core 200 prefetches a branch instruction corresponding to an entry in any of the non-selected BPTs 416a-d, then a respective entry is used to predict a branch direction and subsequent instruction fetches are made based on the prediction.

It is noted that Branch Prediction Unit 400 illustrated in FIG. 4 is an example for demonstrating the disclosed concepts. The number of functional blocks shown, as well as the number of branch prediction tables illustrated, is limited for clarity. In other embodiments, additional functions blocks may be included. Any suitable number of branch prediction tables may also be included.

Figure 5:
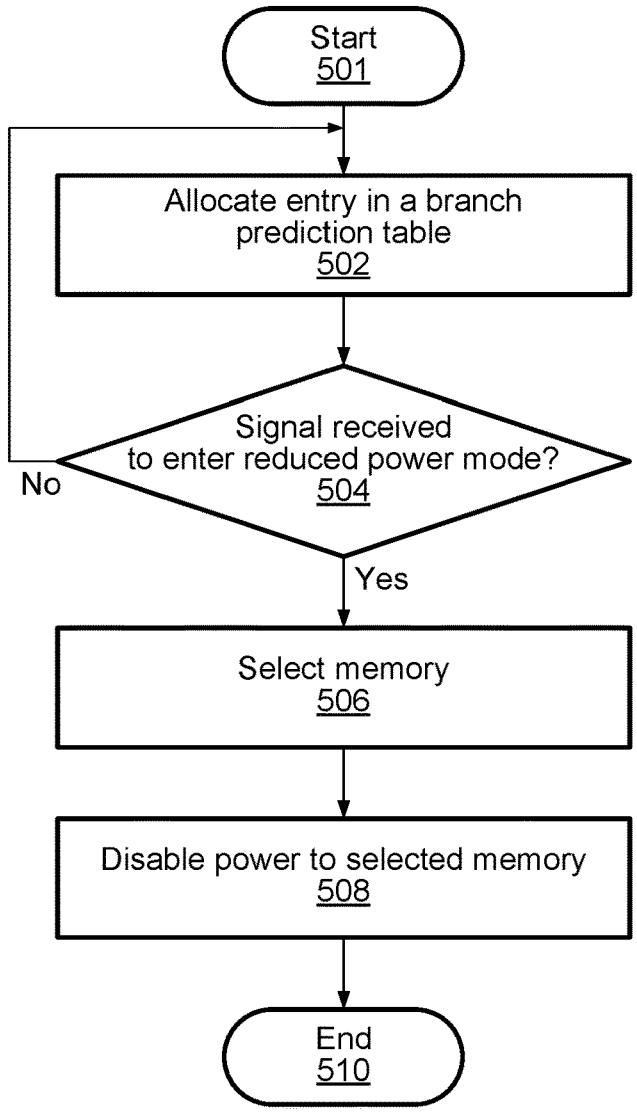
FIG. 5 illustrates a flow diagram of an embodiment of a method for managing branch prediction tables when entering a reduced power mode.

Turning now to FIG. 5, a flow diagram illustrating an embodiment of a method for managing branch prediction tables when entering a reduced power mode is shown. In some embodiments, method 500 may be applied to a branch prediction unit, such as, e.g., Branch Prediction Unit 400 in FIG. 4, included in an SoC, such as SoC 100 in FIG. 1, for example. Referring collectively to FIG. 1, FIG. 4, and the flow diagram of FIG. 5, the method may begin in block 501.

In the present embodiment, an entry is allocated in a branch prediction table (block 502). For each executed branch instruction, control circuitry, such as, for example, Control Logic 404, allocates at least one entry into at least one of BPTs 416a-d. In some cases, a respective entry may be allocated in two or more BPTs 416a-d. In the current embodiment, each of BPTs 416a-d is stored in a separate memory. In other embodiments, however, all four BPTs 416a-d may be stored in a same memory that is segmented into four power domains.

Further operations of method 500 may depend on receiving an indication to enter a reduced power mode (block 504). A signal, such as Mode 422, may be asserted to indicate an imminent transition of SoC 100 into a reduced power mode. In other embodiments, Mode 422 may convey a new data value to Control Logic 404, either serially via a single wire, or over a plurality of wires. The new value may identify a type of reduced power mode if more than one reduced power mode is available in SoC 100. If a transition into a reduced power mode is indicated, then method 500 moves to block 506 to select a memory. Otherwise, if SoC 100 is to remain in an operating mode, then the method moves back to block 502 to allocate more entries.

Control Logic 404 selects at least one memory to be powered down (block 506). As described above in regards to FIG. 4, Control Logic 404 may use any suitable criteria for selecting one or more memories, such as, for example, selecting a predetermined memory, selecting a memory with a least number of allocated entries, or selecting a memory with a least number of useful bits set. In addition, Control Logic 404 may make selections in a given order. For example, Control Logic 404 may determine if BPT 416a meets the selection criteria first, and then proceed to BPT 416b, 416c, and 416d, in order, until a suitable number of memories have been selected. Such a selection process may prioritize keeping the BPTs with more history data powered. In other embodiments, however, other selection orders may be used.

It is noted that although block 506 is illustrated as occurring after block 504, the selection process may begin before an indication to enter the reduced power mode is received. For example, if the selected memories are predetermined, then the selection step has occurred before receiving the indication. In other embodiments, counts of how many allocated entries, or how many useful bits are set, or other tracked criteria for a given BPT 416a-d may be updated upon an access to the given BPT 416a-d. Additionally, upon a change in a count value, the new count value may be compared to a threshold value and a flag set dependent upon the comparison. Upon receiving the indication for the reduced power mode, Control Logic 404 may use the flags as part of the selection process.

Control Logic 404 disables power to the selected memories (block 508). Once suitable memories corresponding to one or more of BPTs 416a-d have been selected, Control Logic 404 disables the corresponding switches of Switches 418a-d to disable power to the memories. In some embodiments, processor 101 and/or other functional blocks may continue to operate in the reduced power mode, while in other embodiments, processor 101 may enter a power down mode in which power is disabled to many circuits of processor 101. In embodiments in which processor 101 powered down, Control Logic 404 may be limited to a predetermined time period in which to select and power down the memories. In other embodiments, Control Logic 404 may send an acknowledgement to the reduced power mode indication to indicate that the memories have been powered down and Branch Prediction Unit 400 is ready for the reduced power mode. In various embodiments, the unselected memories may remain at full power and fully operational, or may be placed into a lower power data retention mode in which the contents of the memories are retained. The method ends in block 510.

It is noted that the method illustrated in FIG. 5 is merely an example for demonstration. In other embodiments, additional operations may be included. In addition, operations may be performed in a different sequence in various embodiments.

Figure 6:
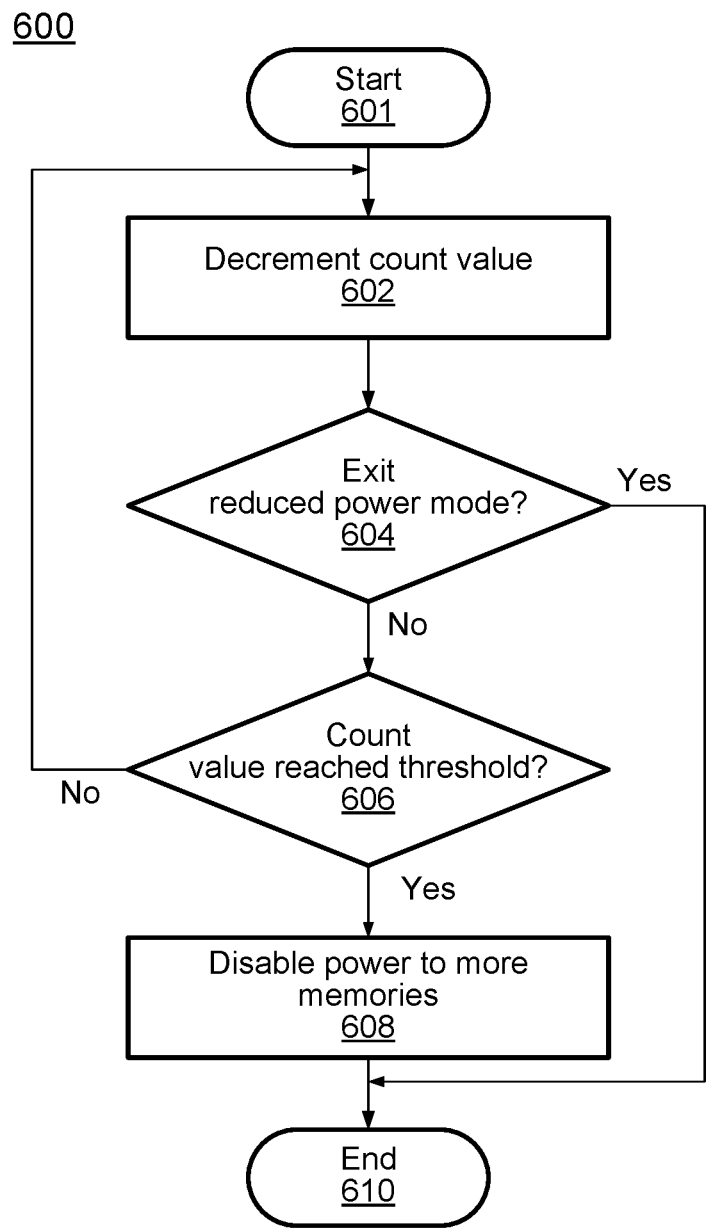
FIG. 6 illustrates a flow diagram depicting an embodiment of a method for powering down memories.

Moving now to FIG. 6, a flow diagram illustrating an embodiment of a method for powering down memories of a branch prediction unit is shown. Method 600 may be applied to a branch prediction unit, such as, for example, Branch Prediction Unit 400 in FIG. 4, included in an SoC, such as SoC 100 in FIG. 1, for example. Method 600 may be performed subsequent to block 508 of method 500 in FIG. 5. Referring collectively to FIG. 1, FIG. 4, and the flow diagram of FIG. 6, the method may begin in block 601 following the end of method 500 with SoC 100 in a reduced power mode and at least one memory associated with BPTs 416a-d powered down.

In the present embodiment, Control Logic 404 decrements a count value (block 602). Counter 405 decrements in response to a transition to a clock signal. As described above in regards to FIG. 4, any suitable active clock source may be used to generate the clock signal and Counter 405 may decrement on rising transitions, falling transitions, or both transitions. In other embodiments, Counter 405 may increment rather than decrement the count value.

Further operations of the method may depend upon an indication to exit the reduced power mode (block 604). Control Logic 404 may receive an indication to exit the reduced power mode via Mode 422. If Mode 422 indicates that the reduced power mode is to be exited, then the method ends in block 610. Otherwise, the method moves to block 606 to determine the count value.

Further operations of the method may depend upon the count value (block 606). The current count value is compared to a threshold value to determine if a predetermined amount of time has elapsed since powering down the selected memory. If the predetermined amount of time has elapsed, then the method moves to block 606 to disable power to more memories in Branch Prediction Unit 400. Otherwise, the method returns to block 602 to further decrement the count value.

Upon the count value reaching the threshold value, Control Logic 404 selects additional memories corresponding to BPTs 416*a-d* to power down (block 608). In the current embodiment, the remaining powered memories are selected and Control Logic 404 disables the corresponding Switches 418*a-d*, powering the remaining active memories down. The method ends in block 610.

In some embodiments, instead of powering down all remaining memories in Branch Prediction Unit 400, a subset of the remaining powered memories may be selected using criteria as previously disclosed. The selected memories may be powered down via the respective Switches 418*a-d*. Method 600 may then repeat, counting for a second elapsed time. The second elapsed time may be the same or different from a first elapsed time. If the indication to exit the reduced power mode is not received, then more memories may be powered down. Method 600 may be repeated as necessary until all memories in Branch Prediction Unit 400 are powered down or the indication to exit the reduced power mode is received.

It is noted that the method illustrated in FIG. 6 is merely an example for demonstration. In other embodiments, additional operations may be included. In addition, operations may be performed in a different sequence in various embodiments.

Figure 7:
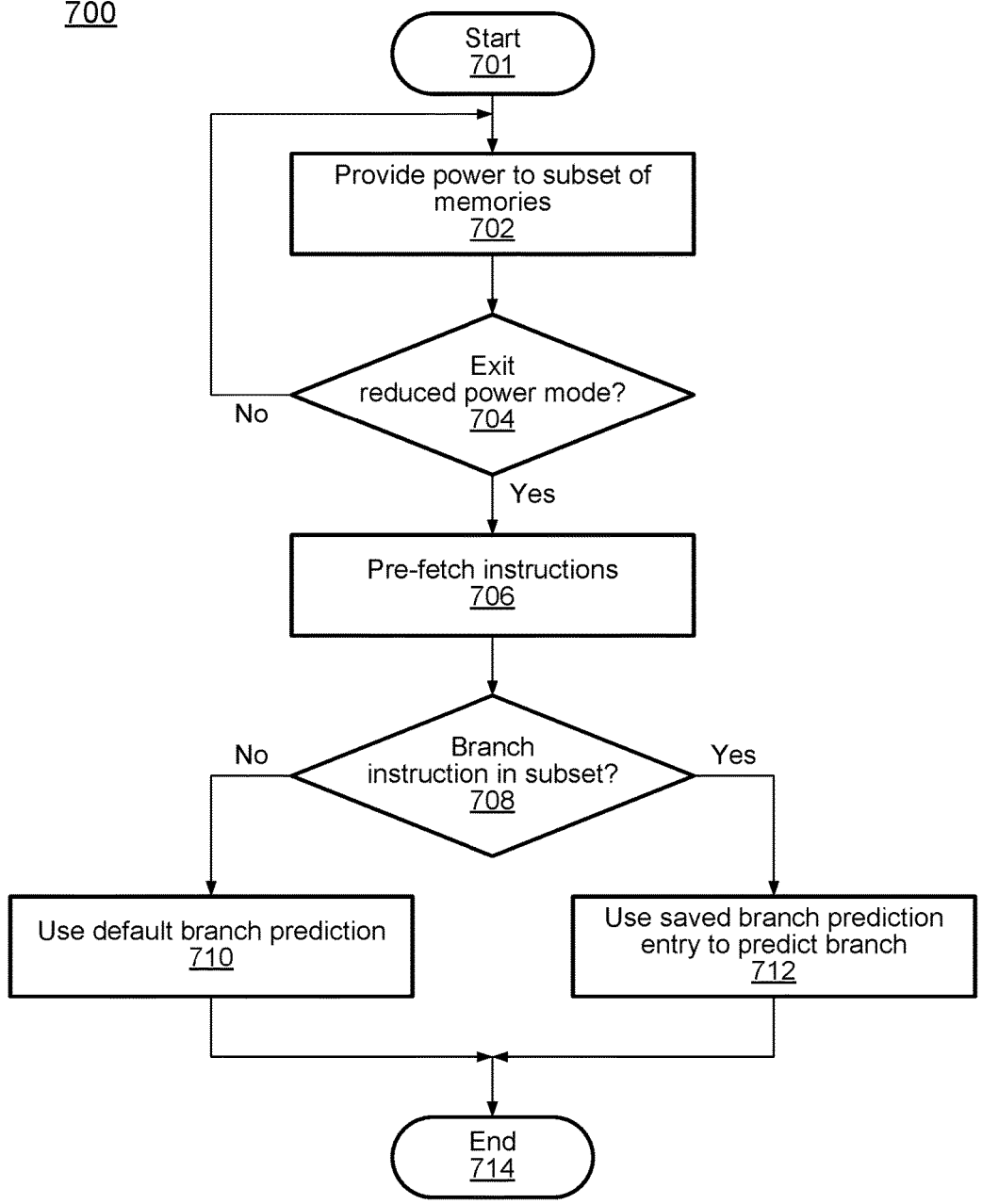
FIG. 7 illustrates a flow diagram depicting an embodiment of a method for recovering from a reduced power mode.

Turning now to FIG. 7, a flow diagram of an embodiment of a method for recovering from a reduced power mode is shown. Method 700 may be applied to a branch prediction unit, such as, for example, Branch Prediction Unit 400 in FIG. 4. In some embodiments, method 700 may be applied subsequent to block 508 of method 500. Referring collectively to FIG. 4 and the flow diagram of FIG. 7, the method may begin in block 701 after Control Logic 404 has powered down selected memories in Branch Prediction Unit 400.

In the illustrated embodiment, power is provided to unselected memories in Branch Prediction Unit 400 (block 702). A subset of memories, including the memories that were not selected during a preceding application of method 500, receives power during the reduced power mode. The selected memories, conversely, are powered down.

Continued operations of method 700 may depend upon an indication to exit the reduced power mode (block 704). Control Logic 404 may receive an indication to exit the reduced power mode via Mode 422. If Mode 422 indicates that the reduced power mode is to be exited, then the method moves to block 706 to pre-fetch instructions. Otherwise, the method returns to block 702 to continue powering the subset of memories.

After receiving the indication to exit the reduced power mode, instructions are pre-fetched (block 706). Branch Prediction Unit 400, in the current embodiment, is included in a processor, such as, for example, Processing Core 200 in FIG. 2. Scheduling Unit 204 causes Instruction Cache 202 to begin pre-fetching instructions after receiving the indication to exit the reduced power mode. One or more of the pre-fetches may include one or more branch instructions.

Further operations of the method may depend on pre-fetching a branch instruction (block 708). Upon pre-fetching a branch instruction, Control Logic 404 determines if an allocated entry corresponding to the pre-fetched branch instruction is currently stored in the subset of memories. If an allocated branch prediction entry is not stored in the subset of memories, then the method moves to block 710 to utilize a default branch prediction value. Otherwise, the method moves to block 712 to utilize data from a corresponding entry in one of the subset of memories.

If a corresponding entry is not stored in the subset of memories, Control Logic 404 uses default prediction values (block 710). In some embodiments, the default values may be retrieved from BPT 416*a*. BPT 416*a*, in various embodiments, may be restored with default values after exiting the reduced power mode or may always be powered on during reduced power modes to retain the default predictions. The method ends in block 714.

In contrast, if a corresponding entry is stored in the subset of memories, Control Logic 404 uses retained data from the corresponding entry to predict the direction of the prefetched branch instruction (block 712). Keeping the subset of memories power during the reduced power mode may allow accumulated branch history to be preserved. Prediction accuracy for prefetched branch instructions may be increased after exiting the reduced power mode when a corresponding entry is identified in the subset of memories. After using the preserved data for the direction prediction, the method ends in block 714.

It is noted that the method illustrated in FIG. 7 is an example for demonstrating the disclosed concepts. In other embodiments, additional operations may be performed, or the operations may be performed in a different sequence. Furthermore, some operations of method 700 may be performed in combination or in parallel with some operations of method 600 in FIG. 6.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of memories configured to store respective data in a plurality of branch prediction entries, wherein each branch prediction entry corresponds to at least one of a plurality of branch instructions; and
   a control circuit configured to:
      store first data associated with a first branch instruction into a corresponding branch prediction entry in at least one memory of the plurality of memories;
      in response to a detection of an indication to enter a reduced power mode:
         select a first memory of the plurality of memories based on respective branch prediction data stored in at least one of the plurality of memories;
         power-down the selected first memory;
         maintain power to one or more memories of the plurality of memories excluding the first memory; and
         cease storing additional data in each of the one or more memories.

2. The apparatus of claim 1, further comprising an execution unit configured to enter a power-down mode in response to the detection of the indication to enter the reduced power mode.

3. The apparatus of claim 1, wherein to select the first memory of the plurality of memories, the control circuit is further configured to select a given memory of the plurality of memories with a greatest number of branch prediction entries that are storing respective data.

4. The apparatus of claim 1, wherein each branch prediction entry of the plurality of branch prediction entries includes a respective status value indicative of a usefulness of data stored in a corresponding branch prediction entry, and wherein to select the first memory of the plurality of memories, the control circuit is further configured to select a given memory of the plurality of memories based on the status value in each of the plurality of branch prediction entries.

5. The apparatus of claim 1, wherein the control circuit is further configured to modify a count value based on a clock signal in response to the detection of the indication to enter the reduced power mode.

6. The apparatus of claim 5, wherein the control circuit is further configured to power-down each of the one or more memories of the plurality of memories in response to a determination that the count value is equal to a predetermined threshold value.

7. The apparatus of claim 1, wherein the control circuit is further configured to:
   prefetch one or more instructions in response to a detection of an indication to exit the reduced power mode;
   determine that the one or more instructions includes a second branch instruction; and
   utilize a second branch prediction entry from a given memory of the one or more memories of the plurality of memories in response to a determination that the second branch prediction entry corresponds to the second branch instruction, wherein the second branch prediction entry is stored in the given memory prior to the detection of the indication to enter the reduced power mode.

8. A method for managing power in a processor, comprising:
   storing first data corresponding to a given branch instruction into a corresponding branch prediction entry in at least one memory of a plurality of memories, wherein each memory of the plurality of memories includes a plurality of branch prediction entries;
   in response to detecting an indication to enter a reduced power mode:
      selecting a first memory of the plurality of memories based on respective branch prediction data stored in one or more of the plurality of memories;
      powering-down the selected first memory;
      maintaining power to one or more of the plurality of memories excluding the first memory; and
      ceasing storage of additional data in each of the one or more of the plurality of memories.

9. The method of claim 8, further comprising entering, by the processor, a power-down mode in response to detecting the indication to enter the reduced power mode.

10. The method of claim 8, wherein selecting the first memory of the plurality of memories comprises selecting a given memory of the plurality of memories with a greatest number of branch prediction entries storing respective data.

11. The method of claim 8, wherein each of the plurality of branch prediction entries includes a respective status value indicative of a usefulness of data stored in the corresponding branch prediction entry, and wherein selecting the first memory of the plurality of memories comprises selecting a given memory of the plurality of memories based on the status values included in the plurality of branch prediction entries.

12. The method of claim 8, further comprising modifying a count value based on a clock signal in response to detecting the indication to enter the reduced power mode.

13. The method of claim 12, further comprising powering-down each of the one or more of the plurality of memories in response to determining that the count value is equal to a predetermined threshold value.

14. The method of claim 8, further comprising powering-down a second memory of the plurality of memories in response to detecting the indication to enter the reduced power mode.

15. A system comprising:
   a system memory; and
   a processor including:
      an instruction cache configured to store a plurality of instructions retrieved from the system memory;
      a scheduling unit configured to retrieve a branch instruction from the plurality of instructions; and
      a branch prediction unit configured to:
         store first data corresponding to the branch instruction in a first branch prediction entry in at least one memory of a plurality of memories, wherein each memory of the plurality of memories includes a plurality of branch prediction entries;
         in response to detecting an indication to enter a reduced power mode:
            select a first memory of the plurality of memories based on respective branch prediction data stored in one or more of the plurality of memories;
            power-down the selected first memory; and
            maintain power to a subset of the plurality of memories, wherein the subset of the plurality of memories includes at least one of the plurality of memories excluding the first memory;
      wherein the processor is configured to enter the reduced power mode in response to detecting the indication.

16. The system of claim 15, wherein to select the first memory of the plurality of memories, the branch prediction unit is further configured to select a predetermined memory of the plurality of memories.

17. The system of claim 15, wherein to select the first memory of the plurality of memories, the branch prediction unit is further configured to select a given memory of the plurality of memories with a greatest number of branch prediction entries storing respective data.

18. The system of claim 15, wherein each of the plurality of branch prediction entries includes a respective status value indicative of a usefulness of data stored in a corresponding branch prediction entry, and wherein to select the first memory of the plurality of memories, the branch prediction unit is further configured to select a given memory of the plurality of memories based on the status values included in the plurality of branch prediction entries.

19. The system of claim 15, wherein the branch prediction unit is further configured to:

modify a count value based on a clock signal in response to detecting the indication to enter the reduced power mode; and power-down each of the subset of the plurality of memories in response to determining that the count value is equal to a predetermined threshold value.

20. The system of claim 15, wherein to enter the reduced power mode, the processor is further configured to enter a power-down mode.

\* \* \* \* \*